United States Patent [19]

Koester et al.

[11] Patent Number: 5,372,727
[45] Date of Patent: Dec. 13, 1994

[54] AUXILIARIES FOR THE FILTRATION AND/OR DEWATERING OF MINERAL AND COAL SUSPENSIONS

[75] Inventors: Rita Koester; Horst Speckmann; Wolfgang von Rybinski; Dieter Koeppl, all of Duesseldorf, Germany

[73] Assignee: Henkel Kommanditgesellschaft auf Aktien, Duesseldorf, Germany

[21] Appl. No.: 960,461

[22] PCT Filed: Jun. 6, 1991

[86] PCT No.: PCT/EP91/01049
§ 371 Date: Dec. 15, 1992
§ 102(e) Date: Dec. 15, 1992

[87] PCT Pub. No.: WO91/19556
PCT Pub. Date: Dec. 26, 1991

[51] Int. Cl.$^5$ ................................ C02F 1/54
[52] U.S. Cl. ........................ 210/729; 209/5; 210/732; 210/778
[58] Field of Search .............. 209/5; 210/725, 727, 210/728, 729, 732, 778; 252/60

[56] References Cited

U.S. PATENT DOCUMENTS

| 2,266,954 | 12/1941 | Bonnet et al. | 210/42 |
| 4,097,390 | 6/1978 | Wang et al. | 210/729 |
| 4,156,649 | 5/1979 | Quinn et al. | 252/60 |
| 4,385,903 | 5/1983 | Moriyama et al. | 210/732 |
| 4,990,264 | 2/1991 | Fuller et al. | 210/778 |
| 5,215,669 | 6/1993 | Koester et al. | 210/778 |

FOREIGN PATENT DOCUMENTS

| 2502509 | 10/1982 | France . |  |
| 1141601 | 12/1962 | Germany | 210/735 |
| 8503065 | 7/1985 | WIPO . |  |

OTHER PUBLICATIONS

Erzmetall, Band 30, Nr. 7/8, 1977, R. Niessen.
*Fat Science Technology*, Band 89, Nr. 3, 1987.
R. Piorr et al.: "Low Foaming Biodegradable Nonionic Surfactants", pp. 106–111.

*Primary Examiner*—Peter A. Hruskoci
*Attorney, Agent, or Firm*—Ernest G. Szoke; Wayne C. Jaeschke; Daniel S. Ortiz

[57] ABSTRACT

Addition of alkyl and/or alkenyl polyalkylene glycol ethers as filtration aids in the filtration and/or dehydration of mineral or coal suspensions reduces the dehydration time, and filter cakes with a low residual moisture content are obtained.

5 Claims, No Drawings

AUXILIARIES FOR THE FILTRATION AND/OR DEWATERING OF MINERAL AND COAL SUSPENSIONS

FIELD OF THE INVENTION

This invention relates to use of alkyl and/or alkenyl polyalkylene glycol ethers as auxiliaries in the filtration and/or dewatering of mineral and coal suspensions.

Background of the Invention

Suspensions often accumulate in the dressing of ores and have to be dewatered before further processing or disposal. This applies, for example, to mineral concentrates which are obtained by concentration processes, for example by flotation or magnetic separation, and also to coal and tailings from the flotation of coal. For economic reasons, it is desirable that the filtration rate in the subsequent dewatering of the suspensions be as high as possible and that the residual water content of the filter cake be as low possible. Particular difficulties are encountered in the filtration of ores and coals which have a large fine-grain component.

Related Art

It is known that surfactants, such as for example dialkyl sulfosuccinates [U.S. Pat. No. 2,266,954] or alkylphenol polyglycol ethers [Erzmetall 30, 292 (1977)], are suitable as auxiliaries for the dewatering of coal suspensions by virtue of their surface active properties. Where surfactants of the type mentioned are used for the filtration of mineral suspensions, vigorous foaming occurs in the often circulated process water, impeding other concentration processes.

In addition, organic polyelectrolytes, for example polyacrylamides or starch derivatives, may also be used for improving the filtration of mineral and coal suspensions. Although auxiliaries such as these often produce an increase in the filtration rate, the residual water content of the mineral concentrates remains unchanged or is even increased in relation to filtration without filtration aids.

The problem addressed by the present invention was to provide new filtration auxiliaries which could be used without any of the disadvantages mentioned above.

BRIEF DESCRIPTION OF THE INVENTION

The present invention relates to the use of alkyl and-/or alkenyl polyalkylene glycol ethers corresponding to formula (I)

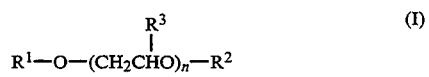

in which $R^1$ is a linear or branched $C_{6-22}$ alkyl and/or alkenyl radical, $R^2$ is a linear or branched $C_{1-8}$ alkyl radical or a benzyl radical, $R^3$ is hydrogen or a methyl radical and n is a number of 1 to 30, as auxiliaries in the filtration and/or dewatering of mineral and coal suspensions.

The invention is based on the observation that the use of terminated polyglycol ethers of the type mentioned has a beneficial effect on the filtration rate and the residual water content of mineral suspensions and involves very little foaming.

DETAILED DESCRIPTION OF THE INVENTION

Alkyl and/or alkenyl polyalkylene glycol ethers which have particularly advantageous properties in the context of the invention contain 12 to 18 carbon atoms in the substituent $R^1$ and 4 to 7 carbon atoms in the substituent $R^2$ and have a value for n of 2 to 10 and preferably 5 to 7 ethylene oxide units.

Alkyl and/or alkenyl polyalkylene glycol ethers are known compounds which may be obtained by conventional methods of preparative organic chemistry. One process for their preparation comprises, for example, reacting adducts of alkylene oxide and primary alcohols with an alkyl or aralkyl halide under the conditions of Williamson's ether synthesis [Fat. Sci. Technol., 89 106 (1987)].

Typical examples of primary alcohols containing 6 to 22 carbon atoms as starting materials for the production of the alkyl and/or alkenyl polyalkylene glycol ethers are caproic alcohol, caprylic alcohol, captic alcohol, lauryl alcohol, myristyl alcohol, cetyl alcohol, palmitoleyl alcohol, stearyl alcohol, oleyl alcohol, elaidyl alcohol, petroselinyl alcohol, gadoleyl alcohol, arachidyl alcohol, behenyl alcohol or erucyl alcohol. In addition, these alcohols may also be present as technical mixtures of the type obtained, for example, by high-pressure hydrogenation of methyl ester fractions based on vegetable and animal raw materials or by hydrogenation of aldehyde cuts from Roelen's oxo synthesis. Technical coconut oil alcohol is a particularly preferred starting material for the production of the polyglycol ethers.

The alkylene oxide adducts of the alcohols mentioned may have an average value for n of 1 to 30 alkylene oxide units. Alkylene oxides are understood to be ethylene oxide and propylene oxide and also mixtures of ethylene oxide and propylene oxide.

Suitable alkylating agents are alkyl and aralkyl halides containing 1 to 8 carbon atoms, such as for example methyl chloride, butyl chloride or benzyl chloride. The alkylation reaction is preferably carried out with butyl chloride or benzyl chloride.

In the context of the invention, the suspensions to be dewatered are aqueous suspensions of ores, for example scheelite, iron ores, tailings from the magnetic separation of iron ores or washed coal.

The filtration aids are typically added in quantities of 25 to 1,000 g/t of a mineral or coal suspension, based on the solids content of the suspension. According to the invention, it is of advantage to use the alkyl and/or alkenyl polyalkylene glycol ethers in quantities of 100 to 500 g/t.

In addition, mixtures of alkyl and/or alkenyl polyalkylene glycol ethers with other conventional dewatering aids, such as for example sulfosuccinates or polyacrylamides, may also be used as filtration aids in the process according to the invention.

The following Examples are intended to illustrate the invention without limiting it in any way.

EXAMPLES

I Filtration aids used:
A1) $C_{12-18}$ coconut fatty alcohol-7 mol EO-butyl ether
A2) $C_{12-18}$ coconut fatty alcohol-5 mol EO-butyl ether
A3) $C_{12-18}$ coconut fatty alcohol-10 mol EO-butyl ether
B1) Nonylphenol-10 mol EO-ether II Dewatering of mineral suspensions

Example 1

Filtration of a scheelite ore.

A scheelite ore having a particle size of 100% by weight smaller than 25 μm was used. Filtration was carried out under the following conditions

| a) Pressure filter 4 bar | |
|---|---|
| Pore size of the filter | 0.15 μm |
| Solids content of the suspension | 40% by weight |
| b) Pressure filter 4 bar | |
| Pore size of the filter | 0.20 μm |
| Solids content of the suspension | 60% by weight |

500 g/t of filtration aid A1) was used as the filtration aid, The mineral suspensions were conditioned for 5 minutes in the presence of the filtration aid. The water content of the mineral suspension was calculated from the quantity of filtrate as a function of time. The results are set out in Tables 1 and 2.

Comparison Example C1:

Example 1 was repeated without the filtration aid. The results of the filtration tests are set out in Tables 1 and 2.

Comparison Example C2:

Example 1 was repeated using 500 g/t of filtration aid B1). The results of the filtration tests are set out in Tables 1 and 2.

TABLE 1

Water content of the filter cake in the pressure filtration of a scheelite ore (figures in % by weight)
Particle size <25 μm, pH = 10, filter: 0.15 μm
Pressure filter 200 ml volume

| Ex. | Filtration time (s) | | | | | |
|---|---|---|---|---|---|---|
|  | 0 | 100 | 200 | 400 | 600 | 800 |
| 1a | 40.0 | 35.0 | 33.5 | 30.0 | 26.5 | 25.0 |
| C1 | 40.0 | 35.5 | 34.0 | 31.5 | 30.0 | 27.5 |
| C2 | 40.0 | 35.5 | 34.0 | 31.0 | 29.0 | 26.0 |

TABLE 2

Water content of the filter cake in the pressure filtration of scheelite ore (figures in % by weight)
Particle size <25 μm, pH = 10, filter: 0.2 μm
Pressure filter 1 l volume

| Ex. | Filtration time (s) | | | | | |
|---|---|---|---|---|---|---|
|  | 0 | 100 | 200 | 400 | 600 | 800 |
| 1b | 60.0 | 50.0 | 44.5 | 31.0 | 17.0 | 16.0 |
| C1 | 60.0 | 50.5 | 45.5 | 39.0 | 25.0 | 21.0 |
| C1 | 60.0 | 50.5 | 45.0 | 36.0 | 20.0 | 19.5 |

Example 2:

Filtration of waste tailings from the magnetic separation of an iron ore.

The particle size of the predominantly silicate-containing test material was 75% by weight smaller than 100 μm. Filtration was carried out under the following conditions:

| Vaccum filtration 1 bar | |
|---|---|
| Pore size of the filter | 7.4 μm |
| Solids content of the suspension | 35% by weight |

500 g/t of filtration aid A2) were used. The mineral suspension was conditioned for 1 minute in the presence of the filtration aid. After the filtration time of 60 seconds, the filter cake was dried at 105° C. to constant weight and the residual water content was determined by differential weighing. The results of the filtration tests are set out in Table 3.

Example 3

Example 2 was repeated using 500 g/t filtration aid A1). The results of the filtration tests are set out in Table 3.

Example 4

Example 2 was repeated using 500 g/t filtration aid A3), The results of the filtration tests are shown in Table 3.

Comparison Example C3:

Example 2 was repeated without the filtration aid. The results of the filtration tests are set out in Table 3.

Comparison Example C4:

Example 2 was repeated using 500 g/t filtration aid B1), The results of the filtration tests are set out in Table 3.

TABLE 3

Residual water content of the filter cake in the vacuum filtration of waste tailings from magnetic separation

| Ex. | Residual water content % by weight |
|---|---|
| 2 | 17.5 |
| 3 | 17.0 |
| 4 | 18.0 |
| C3 | 24.0 |
| C4 | 19.0 |

III. Dewatering of coal suspensions

The coal used was a washed fine coal containing 6.8% by weight water, 3.7% by weight ash and 27.3% by weight volatile constituents. Sieve analysis produced the following results:

| −0.5 mm: | 1.5% by weight |
|---|---|
| 0.5–1.0 mm: | 23.1% by weight |
| 2.0–6.3 mm: | 51.5% by weight |
| >6.3 mm: | 23.9% by weight |

Examples 5 to 7, Comparison Example C5:

Test in a pressure filter.

The pressure filter used was a closed filter nutsche which was filled with the material to be dewatered. Dewatering was carried out by placing the filter under a pressure of 3 bar. The dewatering time was 30 s. A 0.2 mm mesh filter cloth was used as the filter material. 50 g coal were suspended in quantities of 400 ml of the aqueous solutions of filtration aids A1 and A2 (concentrations 0.01 and 0.1 g/l) and filtered after a contact time of 60 s. The residual moisture of the coal after dewatering was determined by drying at 106° C. in accordance with DIN 51 718 (Examples 5 to 7). For comparison, filtration was carried out in the absence of a filtration aid (C5). The results are set out in Table 4.

TABLE 4

| | Filtration of a coal suspension in a pressure filter | | |
|---|---|---|---|
| Ex. | Filtration aid | Conc. g/l | Residual moisture % by weight |
| 5 | A1 | 0.01 | 9.4 |
| 6 | A1 | 0.1 | 6.6 |
| C5 | none | | 11.6 |

Legend: Conc. = concentration of the aqueous solution of the filtration aid

Examples 8 to 11, Comparison Example C6:

Tests in a bucket centrifuge.

The centrifuge used was a bucket centrifuge with which rotational speeds of 300 to 3,400 r.p.m. and centrifugal characteristics of 15 to 2000 g. By continuous variation of the centrifugal characteristic, it was possible to simulate both slowly rotating vibrating sieve centrifuges and also high-speed decanting centrifuges.

Perforated plates with 0.4 to 4.0 mm diameter sieve openings were used as the sieve lining for the centrifuge. The polyglycol ethers used as filtration aids were dissolved in distilled water in concentrations of 0.1 g/l and 1.0 g/l. To carry out the tests in the bucket centrifuge, quantities of 400 ml of the filtration aid solution were poured into a glass vessel. Quantities of 25 g coal, which had previously been weighed into the buckets of the centrifuge, were suspended in these solutions. The wetting time was 60 s in each case. The wetting time was followed by a constant draining time of 180 s for the preliminary dewatering of the samples. The residual moisture contents of the coal samples after preliminary dewatering are set out in Table 5.

TABLE 5

| | Preliminary dewatering | | |
|---|---|---|---|
| Ex. | Filtration aid | Conc. g/l | Residual moisture % by weight |
| 8 | A1 | 0.1 | 39.4 |
| 9 | A1 | 1.0 | 30 |
| 10 | A2 | 0.1 | 39.8 |
| 11 | A2 | 1.0 | 28.6 |
| C6 | None | | 43.6 |

Legend: Conc. = concentration of the aqueous solution of the filtration aid

Examples 12 to 23, Comparison Examples C7 to C9:

Centrifugal characteristics of 43, 111 and 389 g (corresponding to rotational speeds of 500 r.p.m., 800 r.p.m. and 1500 r.p.m.) were adjusted for dewatering in the bucket centrifuge. The dewatering time was 30 s. The results are set out in Table 6.

TABLE 6

| | Dewatering at various centrifugal characteristics | | | |
|---|---|---|---|---|
| Ex. | Filtration aid | Conc. g/l | CC | Residual moisture % by weight |
| 12 | A1 | 0.1 | 43 | 4.6 |
| 13 | A1 | 0.1 | 111 | 4.3 |
| 14 | A1 | 0.1 | 389 | 4.0 |
| 15 | A1 | 1.0 | 43 | 3.5 |
| 16 | A1 | 1.0 | 111 | 3.0 |
| 17 | A1 | 1.0 | 389 | 2.8 |
| 18 | A2 | 0.1 | 43 | 6.7 |
| 19 | A2 | 0.1 | 111 | 4.8 |
| 20 | A2 | 0.1 | 389 | 3.6 |
| 21 | A2 | 1.0 | 43 | 5.1 |
| 22 | A2 | 1.0 | 111 | 4.0 |
| 23 | A2 | 1.0 | 389 | 2.9 |
| C7 | None | | 43 | 7.8 |
| C8 | None | | 111 | 6.1 |
| C0 | None | | 389 | 3.9 |

Legend: CC = centrifugal characteristic

Examples 24 to 39, Comparison Examples C10 to C12:

In another series of tests, solutions of the filtration aids in concentrations of 0.1 g/l and 1.0 g/l were tested at a centrifugal characteristic of 111 g (rotational speed 800 r.p.m.) and with dewatering times of 5, 10 and 30 s. The results are set out in Table 7.

TABLE 7

| | Dewatering with various water removal times | | |
|---|---|---|---|
| Ex. | Filtration aid | DWT s | Residual moisture % by weight |
| 24 | A1 | 5 | 3.7 |
| 25 | A1 | 10 | 3.5 |
| 26 | A1 | 30 | 3.0 |
| 27 | A2 | 5 | 4.6 |
| 28 | A2 | 10 | 4.3 |
| 39 | A2 | 30 | 4.0 |
| C20 | None | 5 | 6.8 |
| C11 | None | 10 | 6.7 |
| C12 | None | 30 | 6.0 |

Legend: DWT = dewatering time

We claim:

1. A process for the separation of water from aqueous mineral and coal suspensions, which comprises adding from 20 to 1000 grams of at least one member selected from the group consisting of alkyl and alkenyl polyalkylene glycol ethers of the formula

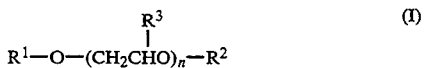

$$R^1-O-(CH_2CHO)_n-R^2 \qquad (I)$$
with $R^3$ on the CHO carbon in which $R^1$ is a linear or branched $C_{12-18}$ alkyl, or a linear or branched $C_{12-18}$ alkenyl group, $R^2$ is a linear or branched $C_{4-7}$ alkyl group or a benzyl group, $R^3$ is hydrogen or a methyl group and n is a number of 2 to 10, per metric ton solids in the aqueous suspension and separating water from the suspension.

2. A process of claim 1 wherein the suspension comprises at least one member selected from the group consisting of scheelite ore, iron ore, waste tailings from the dressing of ores and washed coal.

3. A process of claim 1 wherein $R^2$ is a butyl group.

4. A process of claim 3 wherein $R^3$ is hydrogen.

5. A process of claim 1 wherein $R^3$ is hydrogen.

* * * * *